United States Patent
Perez et al.

(10) Patent No.: US 7,536,960 B1
(45) Date of Patent: May 26, 2009

(54) PORTABLE COMPUTER SUPPORT STAND

(76) Inventors: Enrique Perez, 560 County Rd. 6713, Natalia, TX (US) 78059; Marcos Perez, 1124 County Rd. 669, Devine, TX (US) 78016

(*) Notice: Subject to any disclaimer, the term of this patent is extended or adjusted under 35 U.S.C. 154(b) by 468 days.

(21) Appl. No.: 11/274,950

(22) Filed: Nov. 16, 2005

(51) Int. Cl.
    *A47B 23/00* (2006.01)
(52) U.S. Cl. .................. 108/43; 108/27; 108/50.01
(58) Field of Classification Search .......... 108/43, 108/25, 27, 92, 55.1, 50.01, 50.02; 248/346.01, 248/346.05, 917, 444
    See application file for complete search history.

(56) References Cited

U.S. PATENT DOCUMENTS

| | | | |
|---|---|---|---|
| 5,176,274 A | | 1/1993 | Jenkins |
| 5,598,786 A | | 2/1997 | Patterson |
| 5,623,869 A | * | 4/1997 | Moss et al. ............... 108/43 |
| 5,623,881 A | * | 4/1997 | Huang ................. 108/50.01 |
| 5,829,501 A | * | 11/1998 | DeVito .................... 108/92 |
| 5,947,569 A | * | 9/1999 | Rheault et al. .......... 108/50.02 |
| 5,979,337 A | * | 11/1999 | Clark et al. ............... 108/43 |
| 6,003,446 A | | 12/1999 | Leibowitz |
| D428,729 S | | 8/2000 | Weitzman et al. |
| 6,115,249 A | * | 9/2000 | Cipolla et al. ........... 361/687 |
| 6,234,085 B1 | * | 5/2001 | Ramundo ................ 108/43 |
| 6,286,440 B1 | * | 9/2001 | Jyringi ................. 108/50.01 |
| 6,353,530 B1 | | 3/2002 | Zarek et al. |
| 6,367,392 B2 | * | 4/2002 | Moore ..................... 108/27 |
| 6,496,360 B1 | | 12/2002 | Cordes et al. |
| 6,672,465 B2 | * | 1/2004 | White et al. ............. 108/50.02 |
| 6,701,851 B2 | * | 3/2004 | Ibrahim ................. 108/50.01 |
| 6,832,561 B2 | * | 12/2004 | Johnson ................. 108/50.01 |
| 7,004,081 B2 | * | 2/2006 | Chang .................. 108/50.01 |
| 7,150,236 B1 | * | 12/2006 | Riley ...................... 108/43 |
| 7,249,747 B2 | * | 7/2007 | Marceau et al. ............. 108/43 |
| 7,275,724 B1 | * | 10/2007 | Ward ...................... 108/43 |
| 7,293,751 B2 | * | 11/2007 | Eriksson .................. 108/43 |
| 2002/0003197 A1 | * | 1/2002 | MacEachern .......... 248/346.01 |

* cited by examiner

*Primary Examiner*—José V Chen

(57) ABSTRACT

An apparatus includes a base that has a thermo-resistive top surface and oppositely seated edges that have apertures formed therein. A top casing has an inner perimeter aligned above the base and maintains a fixed elevated spatial relationship therewith. The top casing has holes formed along an outer perimeter thereof, and is formed from non-conductive and transparent material. Elongated pegs have bores formed therethrough and have opposed ends coupled to a top casing bottom surface and a base top surface. The axial bores are aligned with the apertures and the holes for receiving fasteners therethrough. The portable computer is nested on the base and interfitted between the inner perimeter of the top casing such that the portable computer is advantageously restricted from moving. The portable computer is spaced from the user's genitalia such that heat generated from the portable computer is dissipated away from the user's genitalia.

15 Claims, 4 Drawing Sheets

US 7,536,960 B1

PORTABLE COMPUTER SUPPORT STAND

CROSS REFERENCE TO RELATED APPLICATIONS

Not applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to computer stands and, more particularly, to a portable computer stand apparatus for supporting a portable computer at an elevated position above a user's genitalia.

2. Prior Art

In the development of computers, particularly of the types known in the art as laptop or notebook, efforts have been directed to providing as many features as possible in a small and light weight package. The most efficient and physically rugged universal package that has evolved in the art is one in which the display screen portion is hinged on the portion of the keyboard away from the user. Thus it can be positioned essentially vertical with respect to the keyboard when in use and can be folded down over the keyboard when not in use.

A major advantage of the portable computer is that work can be performed without a specific work location or even a specific supporting surface, which in turn makes it possible to performing work while traveling on various types of conveyances, and while waiting in terminals. However there are many situations where a person desiring to use a portable computer may not have a stable and comfortable surface on which to position the portable computer.

Heretofore in the art, other than sitting with the personal computer on a desk, positioning the portable computer on the lap when the person using it is in a seated position has been the principal way for a user to retain a portable computer while doing work on it. With the personal computer on the user's lap, while work can take place for a while, it is not long before the hands and forearms become tired, the portable computer will require attention to retain it in the proper position during such things as vehicle motion or need for the user to move and it is uncomfortable for the user to hold the knees together and at the same height.

Furthermore, it has been shown that the electronic components of a portable computer can generate a considerable amount of heat during operation. This hampers the user's ability to hold the portable computer on their lap for an extended period of time, thus limiting the amount of work a person can do. In the instance of male users, such heat and other radiation emitted by the portable computer has also been shown to have adverse effects on their genitalia, especially the testicles. Such effects include a reduction in sperm count and an increased risk of developing testicular cancer.

Accordingly, a need remains for a portable computer stand apparatus in order to overcome the above-noted shortcomings. The present invention satisfies such a need by providing a portable computer stand that is comfortable, safe and easy to use, lightweight and portable in design, and increases the convenience associated with using portable computers. Such a stand ventilates the user's legs and prevents discomfort or burns that can occur from heat generated by the portable computer. The wide and solid base provided with the stand also reduces the strain on the user's legs, thus allowing for extended periods of use.

In addition to those advantages, the portable computer stand helps men guard against a new potential danger that has been discovered in connection with the use of lap mounted portable computers, namely a possible reduction in fertility. A study to this effect was reported on Dec. 9, 2004 in the journal *Human Reproduction*. The study showed that testicular temperatures rose between 4.6 and 5 degrees Fahrenheit. Increases in the range of 1.8 to 5.2 degrees Fahrenheit have been shown to cause negative effects in sperm development and production.

BRIEF SUMMARY OF THE INVENTION

In view of the foregoing background, it is therefore an object of the present invention to provide a portable computer support stand. These and other objects, features, and advantages of the invention are provided by an apparatus for supporting a portable computer at an elevated position above a user's genitalia.

The apparatus includes a base member that has a planar top surface formed from thermo-resistive material. Such a base member includes a centrally registered longitudinal axis and oppositely seated edge portions equidistantly spaced from the axis. The edge portions extend parallel to the axis and have a plurality of apertures formed therein respectively. The base member preferably has an outer perimeter outwardly displaced from the outer perimeter of the top casing.

A top casing has an inner perimeter centrally aligned above the base member. Such a top casing has a fixed spatial relationship with the base member and remains elevated from the base member during operating conditions. The top casing further has a plurality of holes formed along an outer perimeter thereof. The inner perimeter is situated inwardly from the edge portions. The top casing may have an opening defined along a front wall thereof. Such an opening passes through the inner and outer perimeter such that the user can advantageously quickly and effectively access a touchpad of the portable computer. Such a top casing is formed from non-conductive and transparent material.

The top casing may have a planar top surface provided with a plurality of cup holders disposed along a back one of the edge portions such that a keyboard region of the portable computer advantageously and effectively remains free from foodstuff and the like. The top surface further preferably has a corrugated sidewall. Such a corrugated sidewall defines a plurality of crests centrally registered above a CD drive and a floppy disk drive of the portable computer respectively for advantageously and conveniently assisting the user to access peripheral devices from the corrugated sidewall.

A plurality of elongated pegs have axial bores formed therethrough respectively. Such pegs further have axially opposed end portions directly coupled to a bottom surface of the top casing and a top surface of the base member wherein the axial bores are vertically aligned with associated ones of the apertures and the holes for effectively receiving fasteners therethrough respectively. The pegs are effectively intercalated between the base member and the top casing. The portable computer is removably nested directly on the base member and interfitted between the inner perimeter of the top casing such that the portable computer is advantageously restricted from moving beyond a predetermined boundary defined by the inner perimeter of the top casing. Such a portable computer is conveniently spaced from the user's genitalia such that heat generated form the portable computer is effectively dissipated away from the user's genitalia.

The apparatus may further include a plurality of elongated legs that have top end portions directly conjoined to a bottom surface of the base member. The base member is effectively elevated and maintained at a static position above the user's genitalia during operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
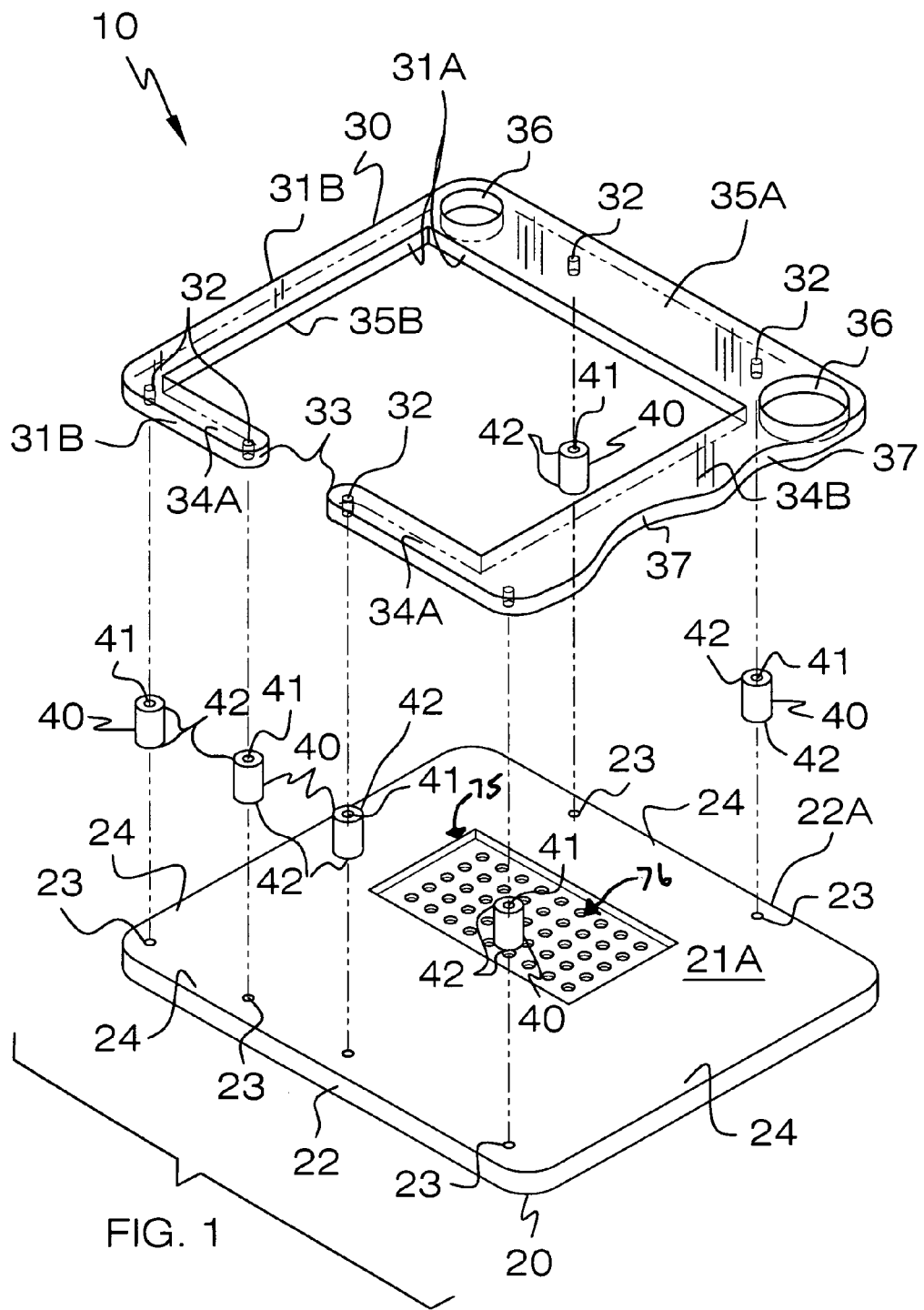
FIG. 1 is an exploded perspective view showing a portable computer support stand, in accordance with the present invention.
Figure 2:
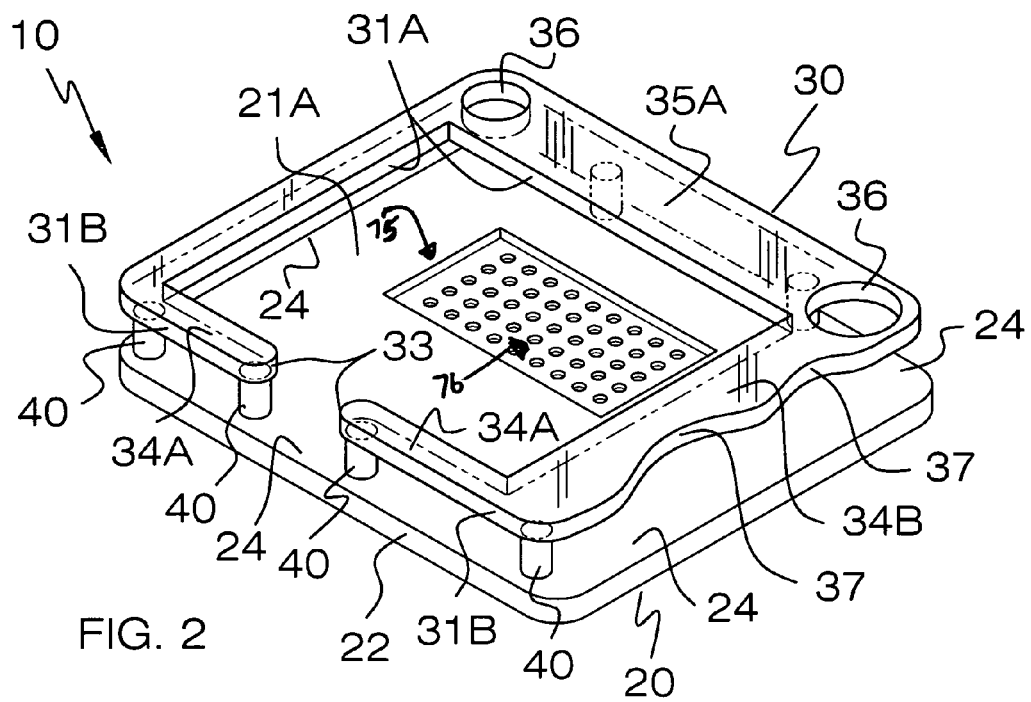
FIG. 2 is an assembled perspective view of the apparatus shown in FIG. 1.
Figure 3:
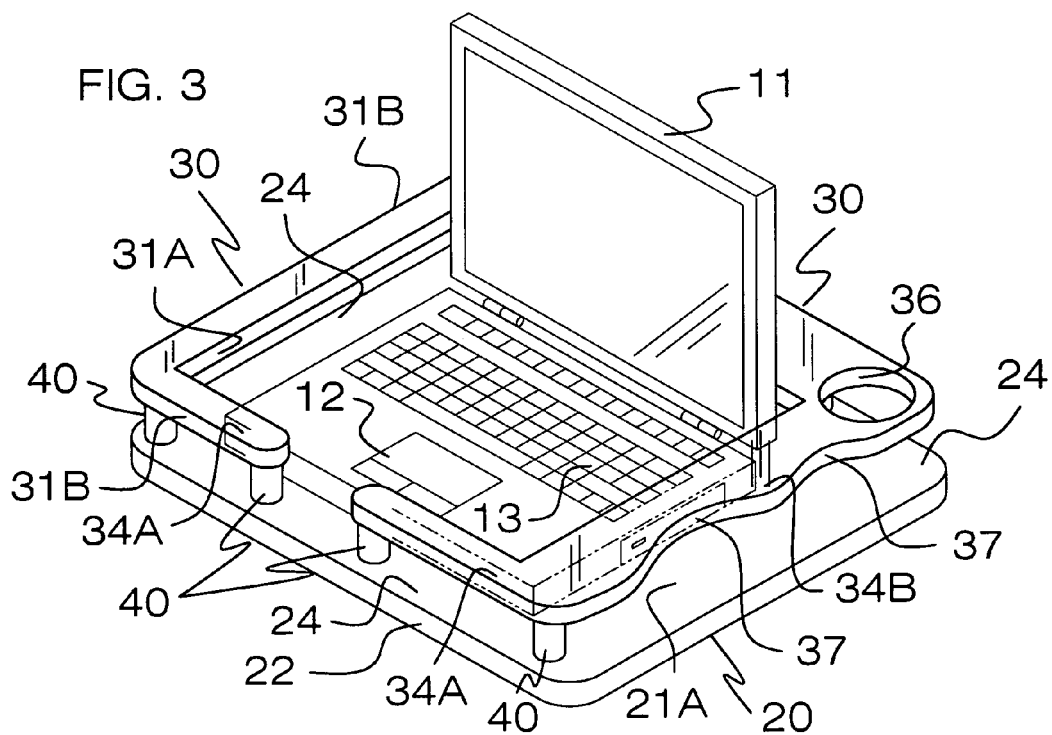
FIG. 3 is a perspective view of the apparatus shown in FIG. 2, showing the portable computer positioned therein.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-6 by the reference numeral 10 and is intended to provide a portable computer support stand. It should be understood that the apparatus 10 may be used to support many different types of items and articles and should not be limited in use to only supporting portable computers.

Referring initially to FIGS. 1 through 5, the apparatus 10 includes a base member 20 that has a planar top surface 21A formed from thermo-resistive material, which is a vital and advantageous feature for preventing heat generated by the portable computer 11 from passing to the user's legs and genitals. Such a base member 20 includes a centrally registered longitudinal axis and oppositely seated edge portions 22 equidistantly spaced from the axis. The edge portions 22 extend parallel to the axis and have a plurality of apertures 23 formed therein respectively. The base member 20 has an outer perimeter 24 outwardly displaced from the outer perimeter 31B (described herein below) of the top casing 30 (described herein below). Of course, the base member 20 may be produced in a variety of different shapes and sizes, so as to accommodate variously shaped portable computers 11, as is obvious to a person of ordinary skill in the art.

Referring to FIGS. 1 through 7, a top casing 30 has an inner perimeter 31A centrally aligned above the base member 20. Such a top casing 30 has a fixed spatial relationship with the base member 20 and remains elevated from the base member 20 during operating conditions. The top casing 30 further has a plurality of holes 32 formed along an outer perimeter 31B thereof. The inner perimeter 31A is situated inwardly from the edge portions 22. The top casing 30 further has an opening 33 defined along a front wall 34A thereof. Such an opening 33 passes through the inner 31A and outer 31B perimeters, which is an essential feature such that the user can advantageously quickly and effectively access a touchpad 12 of the portable computer 11. Of course, the opening 33 may be formed in various locations and with different widths depending on the location and size of the touchpad 12 of the portable computer 11, as is obvious to a person of ordinary skill in the art. Such a top casing 30 is formed from non-conductive and transparent material.

Referring to FIGS. 1, 2, 3 and 6, the top casing 30 has a planar top surface 35A provided with a plurality of cup holders 36 disposed along a back one 22A of the edge portions 22, which is crucial such that a keyboard region 13 of the portable computer 11 advantageously and effectively remains free from foodstuff and the like. The top surface 35A further has a corrugated sidewall 34B. Such a corrugated sidewall 34B defines a plurality of crests 37 centrally registered above a CD drive 14 and a floppy disk drive (not shown) of the portable computer 11 respectively, which is important for advantageously and conveniently assisting the user to access peripheral devices 14 from the corrugated sidewall 34B. Of course, the corrugated sidewall 34B may be alternately positioned, depending on the location of the peripheral devices 14, as is obvious to a person of ordinary skill in the art.

Referring to FIGS. 1 through 5, a plurality of elongated pegs 40 have axial bores 41 formed therethrough respectively. Such pegs 40 further have axially opposed end portions 42 directly coupled, without the use of intervening elements, to a bottom surface 35B of the top casing 30 and a top surface 21A of the base member 20 wherein the axial bores 41 are vertically aligned with associated ones of the apertures 23 and the holes 32 for effectively receiving fasteners (not shown) therethrough respectively. The pegs 40 are effectively intercalated between the base member 20 and the top casing 30. The space formed between the top casing 30 and the base member 20 advantageously allows for cords to pass therethrough and allows for improved heat dissipation form the portable computer 11.

The portable computer is conveniently and removably nested directly, without the use of intervening elements, on the base member 20 and interfitted between the inner perimeter 31A of the top casing 30, which is critical such that the portable computer 11 is advantageously restricted from moving beyond a predetermined boundary defined by the inner perimeter 31A of the top casing 30. Such a portable computer 11 is conveniently spaced from the user's genitalia such that heat generated form the portable computer 11 is effectively dissipated away from the user's genitalia, thus reducing the risks associated with supporting the portable computer 11 directly on one's lap.

Referring back to FIGS. 1 and 2, the base member 20 has a recessed region 75 monolithically formed therein and vertically and downwardly offset from a top surface 21A of the base member 20. The recessed region 75 has a plurality of holes 76 formed therein and passing through an entire thickness of the base member 20. The holes 76 are situated below a top surface 21A of the base member 20 wherein a fixed spatial distance 77 is maintained between a bottom surface of the laptop 11 and the recessed region 75 for facilitating ventilation of hot air emanating outwardly from the laptop 11 during operating conditions, as perhaps best shown in FIGS. 4 and 5.

Figure 4:
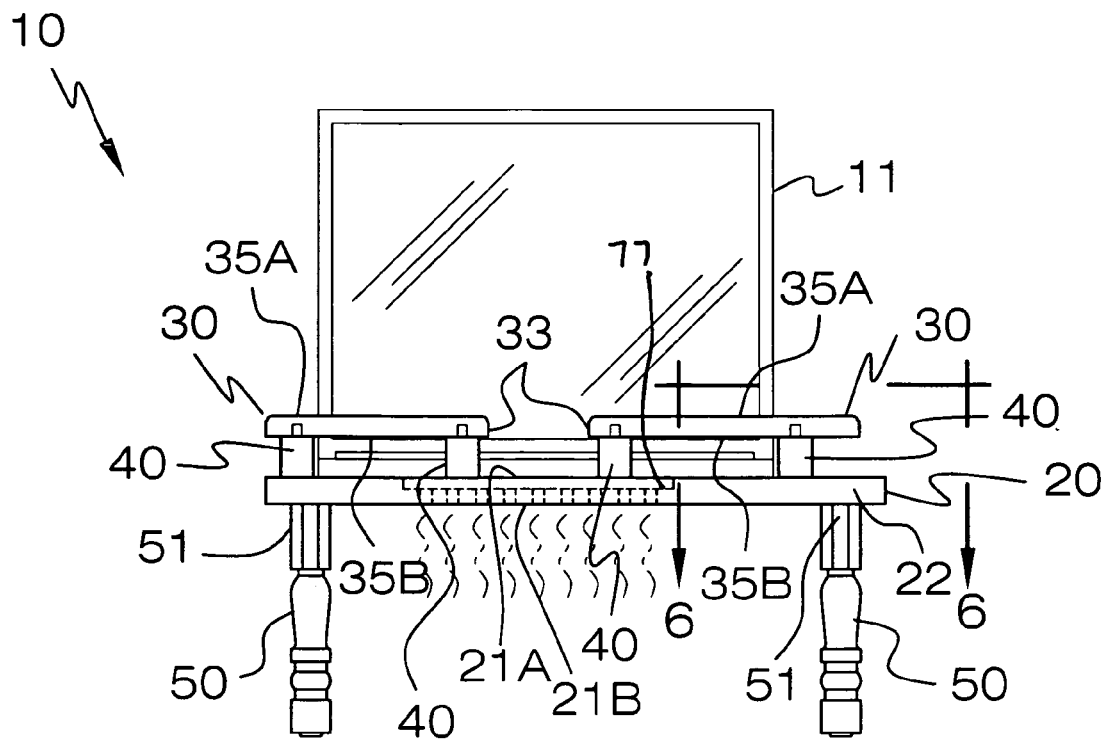
FIG. 4 is a front-elevational view of the apparatus shown in FIG. 3.
Figure 5:
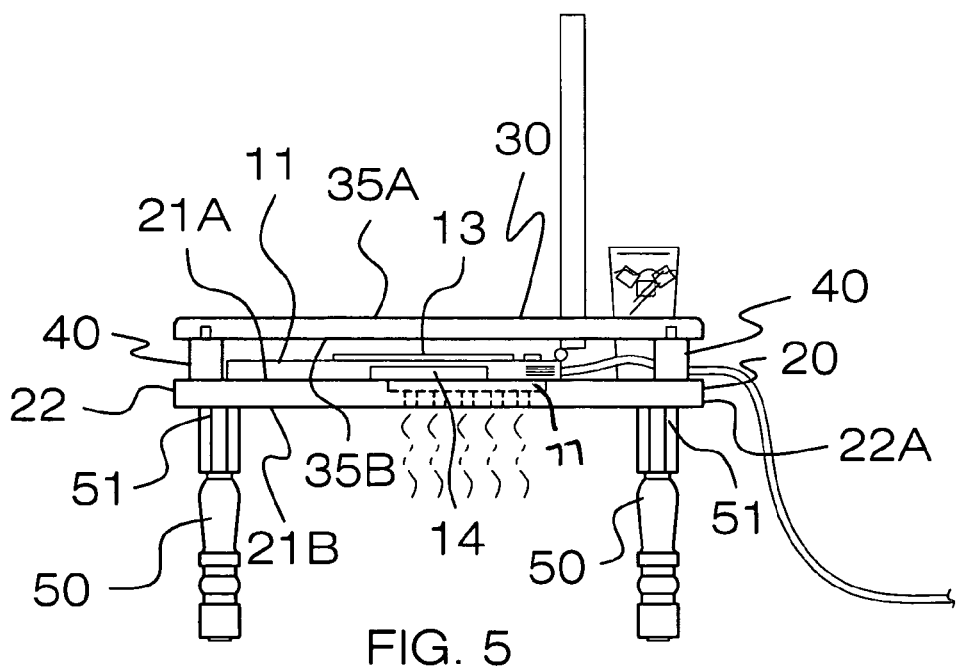
FIG. 5 is a side-elevational view of the apparatus shown in FIG. 3.
Figure 6:
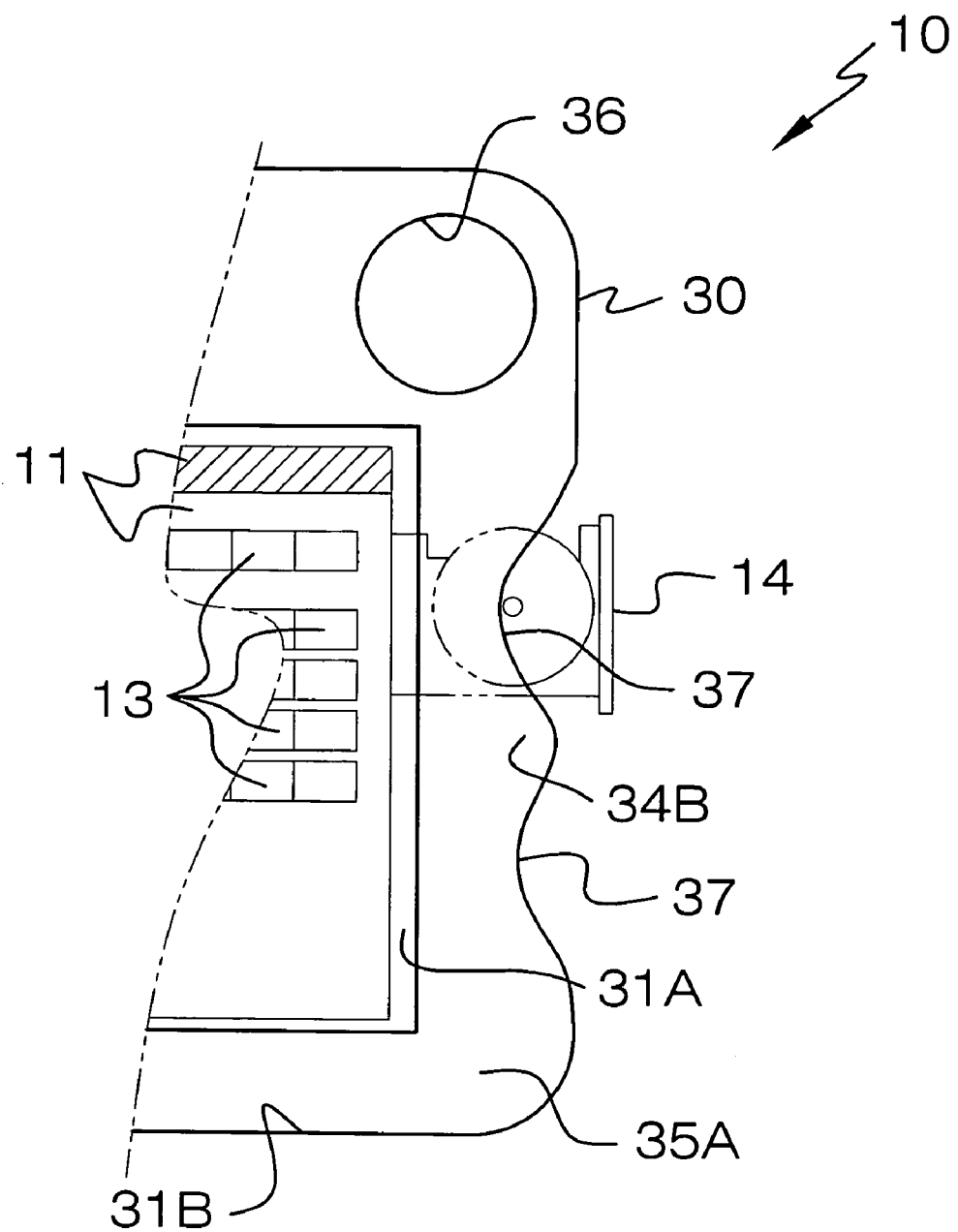
FIG. 6 is a top plan view of the apparatus shown in FIG. 4, taken along line 6-6, showing the access granted to peripheral devices by the corrugated sidewall.

Referring to FIGS. 4 and 5, the apparatus 10 further includes a plurality of elongated legs 50 that have top end portions 51 directly conjoined, without the use of intervening elements, to a bottom surface 21B of the base member 20. The base member 20 is effectively elevated and maintained at a static position above the user's genitalia during operating conditions. Of course, such a plurality of elongated legs 50 may be produced in a variety of shapes and to be adjustable in length for accommodating alternately sized users, as is obvious to a person of ordinary skill in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined apparatus and portable computer for supporting the portable computer at an elevated position above a user's genitalia, said combined apparatus and portable computer comprising:

a base member having a planar top surface formed from thermo-resistive material, said base member including a centrally registered longitudinal axis and oppositely seated edge portions equidistantly spaced from the axis, said edge portions extending parallel to the axis and having a plurality of apertures formed therein respectively;

a top casing having an inner perimeter centrally aligned above said base member, said top casing having a fixed spatial relationship with said base member and remains elevated from said base member during operating conditions, said top casing further having a plurality of holes formed along an outer perimeter thereof, said inner perimeter being situated inwardly from said edge portions;

a portable computer having a touchpad and a keyboard region situated at a top surface of sad portable computer; and a plurality of elongated pegs having axial bores formed therethrough respectively, said pegs further having axially opposed end portions directly coupled to a bottom surface of said top casing and a top surface of said base member wherein said axial bores are vertically aligned with associated ones of said apertures and said holes for receiving fasteners therethrough respectively;

wherein the portable computer is removably nested directly on said base member and positioned between said inner perimeter of said top casing such that the portable computer is restricted from moving beyond a predetermined boundary defined by said inner perimeter of said top casing.

2. The apparatus of claim 1, wherein sad base member has an outer perimeter outwardly displaced from said outer perimeter of said top casing;

wherein said top casing has a planar top surface provided with a plurality of cup holders disposed along a back one of said edge portions such that said keyboard region of the portable computer remains free from foodstuff.

3. The apparatus of claim 2, wherein said top surface further has a corrugated sidewall, said portable computer having a CD drive, said corrugated sidewall defining a plurality of crests centrally registered above said CD drive for assisting the user to access said portable computer from said corrugated sidewall.

4. The apparatus of claim 1, further comprising: a plurality of elongated legs having top end portions directly conjoined to a bottom surface of said base member, said base member being adapted to remain elevated and a static position above the user's genitalia during operating conditions.

5. The apparatus of claim 1, wherein said top casing has an opening defined along a front wall thereof, said opening passing through said inner and outer perimeter such that the user can quickly and effectively access said touchpad of the portable computer.

6. A combined apparatus and portable computer for supporting said portable computer at an elevated position above a user's genitalia, said combined apparatus and portable computer comprising:

a base member having a planar top surface formed from thermo-resistive material, said base member including a centrally registered longitudinal axis and oppositely seated edge portions equidistantly spaced from the axis, said edge portions extending parallel to the axis and having a plurality of apertures formed therein respectively;

a top casing having an inner perimeter centrally aligned above said base member, said top casing having a fixed spatial relationship with said base member and remains elevated from said base member during operating conditions, said top casing further having a plurality of holes formed along an outer perimeter thereof, said inner perimeter being situated inwardly from said edge portions;

wherein said top casing is formed from non-conductive and transparent material;

a portable computer having a touchpad and a keyboard region situated at a top surface of said portable computer; and a plurality of elongated pegs having axial bores formed therethrough respectively, said pegs further having axially opposed end portions directly coupled to a bottom surface of said top casing and a top surface of said base member wherein said axial bores are vertically aligned with associated ones of said apertures and said holes for receiving fasteners therethrough respectively;

wherein the portable computer is removably nested directly on said base member and positioned between said inner perimeter of said top casing such that the portable computer is restricted from moving beyond a predetermined boundary defined by said inner perimeter of said top casing.

7. The apparatus of claim 6, wherein said base member has an outer perimeter outwardly displayed from said outer perimeter of said top casing;

wherein said top casing has a planar top surface provided with a plurality of cup holders disposed along a back one of said edge portions such that said keyboard region of the portable computer remains free from foodstuff.

8. The apparatus of claim 7, wherein sad top surface further has a corrugated sidewall, said portable computer having a CD drive, said corrugated sidewall defining a plurality of crests centrally registered above said CD drive for assisting the user to access said portable computer from said corrugated sidewall.

9. The apparatus of claim 6, further comprising: a plurality of elongated legs having top end portions directly conjoined to a bottom surface of said base member, said base member being adapted to remain elevated and at a static position above the user's genitalia during operating conditions.

10. The apparatus of claim 6, wherein said top casing has an opening defined along a front wall thereof, said opening passing through said inner and outer perimeter such that the user can quickly and effectively access said touchpad of the portable computer.

11. A combined apparatus and portable computer for supporting said portable computer at an elevated position above a user's genitalia, said combined apparatus and portable computer comprising:

a base member having a planar top surface formed from thermo-resistive material, said base member including a centrally registered longitudinal axis and oppositely seated edge portions equidistantly spaced from the axis, said edge portions extending parallel to the axis and having a plurality of apertures formed therein respectively;

a top casing having an inner perimeter centrally aligned above said base member, said top casing having a fixed spatial relationship with said base member and remains elevated from said base member during operating conditions, said top casing further having a plurality of holes formed along an outer perimeter thereof, said inner perimeter being situated inwardly from said edge portions;

wherein said top casing is formed from non-conductive and transparent material;

a portable computer having a touchpad and a keyboard region situated at a top surface of said portable computer; and a plurality of elongated pegs having axial bores formed therethrough respectively, said pegs further having axially opposed end portions directly coupled to a bottom surface of said top casing and a top surface of said base member wherein said axial bores are vertically aligned with associated ones of said apertures and said holes for receiving fasteners therethrough respectively, wherein said pegs are intercalated between said base member and said top casing;

wherein the portable computer is removably nested directly on said base member and positioned between said inner perimeter of said top casing such that the portable computer is restricted from moving beyond a predetermined boundary defined by said inner perimeter of said top casing;

wherein base member has a recessed region monolithically formed therein and vertically and downwardly offset from a top surface of said base member, said recessed region having a plurality of holes formed therein and passing through an entire thickness of said base member, said holes being situated below a top surface of said base member wherein a fixed spatial distance is maintained between a bottom surface of the portable computer and said recessed region for facilitating ventilation of hot air emanating outwardly from said portable computer during operating conditions.

12. The apparatus of claim 11, wherein said base member has an outer perimeter outwardly displaced from said outer perimeter of said top casing;

wherein said top casing has a planar top surface provided with a plurality of cup holders disposed along a back one of said edge portions such that said keyboard region of the portable computer remains free from foodstuff.

13. The apparatus of claim 12, wherein said top surface further has a corrugated sidewall, said portable computer having a CD drive, said corrugated sidewall defining a plurality of crests centrally registered above said CD drive for assisting the user to access the portable computer from said corrugated sidewall.

14. The apparatus of claim 11, further comprising: a plurality of elongated legs having top end portions directly conjoined to a bottom surface of said base member, said base member being adapted to remain elevated and at a static position above the user's genitalia during operating conditions.

15. The apparatus of claim 11, wherein said top casing has an opening defined along a front wall thereof, said opening passing through said inner and outer perimeter such that the user can quickly and effectively access said touchpad of the portable computer.

* * * * *